US012600247B2

(12) United States Patent　　　(10) Patent No.:　US 12,600,247 B2
Mizuki　　　　　　　　　　　　　　(45) Date of Patent:　Apr. 14, 2026

(54) BATTERY ATTACHING/DETACHING STRUCTURE

(71) Applicant: Isuzu Motors Limited, Yokohama (JP)

(72) Inventor: Takashi Mizuki, Fujisawa (JP)

(73) Assignee: Isuzu Motors Limited, Yokohama (JP)

( * ) Notice: Subject to any disclaimer, the term of this patent is extended or adjusted under 35 U.S.C. 154(b) by 294 days.

(21) Appl. No.: 18/427,882

(22) Filed: Jan. 31, 2024

(65) Prior Publication Data

US 2024/0253478 A1　　Aug. 1, 2024

(30) Foreign Application Priority Data

Feb. 1, 2023　(JP) .................................. 2023-014065

(51) Int. Cl.
　B60L 50/60　　　(2019.01)
　B60L 50/64　　　(2019.01)
　B60L 53/80　　　(2019.01)
(52) U.S. Cl.
　CPC .............. B60L 50/66 (2019.02); B60L 50/64 (2019.02); B60L 53/80 (2019.02)
(58) Field of Classification Search
　CPC ........................ B60L 53/80; B60K 2001/0494
　See application file for complete search history.

(56) References Cited

U.S. PATENT DOCUMENTS 3,989,118　A　*　11/1976　Hansen .................... B60R 16/04
　　　　　　　　　　　　　　　　　180/68.5
11,233,291　B2 *　1/2022　Confer ................ H01M 50/264

2008/0006459　A1 *　1/2008　Niebuhr .................... B60K 1/04
　　　　　　　　　　　　　　　　　180/68.5
2012/0037437　A1 *　2/2012　Fernandez-Mateo ... B60L 53/80
　　　　　　　　　　　　　　　　　29/700
2012/0111654　A1 *　5/2012　Origuchi ................. B60L 53/80
　　　　　　　　　　　　　　　　　180/68.5
2012/0217077　A1 *　8/2012　Ojima ..................... B60L 50/66
　　　　　　　　　　　　　　　　　180/68.5
2012/0315117　A1 *　12/2012　Gilland ................... B60L 53/80
　　　　　　　　　　　　　　　　　414/535
2014/0360011　A1 *　12/2014　Mulato .................... B60K 1/04
　　　　　　　　　　　　　　　　　29/729

(Continued)

FOREIGN PATENT DOCUMENTS

DE　　102005051015　　4/2007
EP　　2269879　　1/2011

(Continued)

*Primary Examiner* — Brian L Swenson

(57)　　　　ABSTRACT

A battery attaching/detaching structure includes: a guide part fixed to a vehicle and extended from a vehicle inside position to a vehicle outside position in an approximately horizontal direction; a mounting stand on which a battery for running the vehicle is placed, the mounting stand being configured to be guided by the guide part to move between the vehicle inside position and the vehicle outside position; a restraining part configured to restrain the battery at the mounting stand; and an operation cable configured to operate the restraining part to restrain the battery when the mounting stand is operated to move from the vehicle outside position to the vehicle inside position, and operate the restraining part to release restraint of the battery when the mounting stand is operated to move from the vehicle inside position to the vehicle outside position.

6 Claims, 8 Drawing Sheets

(56)                    References Cited

U.S. PATENT DOCUMENTS

| | | | |
|---|---|---|---|
| 2015/0037625 A1* | 2/2015 | Wen | B60L 50/64 |
| | | | 429/96 |
| 2016/0200186 A1* | 7/2016 | Hawighorst | B60L 53/80 |
| | | | 180/68.5 |
| 2018/0130983 A1* | 5/2018 | Tessier | H01M 50/202 |
| 2021/0170852 A1* | 6/2021 | Fan | A01D 34/78 |
| 2024/0234908 A1* | 7/2024 | Zhang | H01M 50/249 |

FOREIGN PATENT DOCUMENTS

| | | |
|---|---|---|
| JP | 2001-122593 | 5/2001 |
| JP | 2014-154398 | 8/2014 |

* cited by examiner

A-A CROSS SECTION

BATTERY ATTACHING/DETACHING STRUCTURE

RELATED APPLICATIONS

This application claims the benefit of Japanese Patent Application No. 2023-014065 filed on Feb. 1, 2023, the contents of which are incorporated by reference as if fully set forth herein in their entirety.

TECHNICAL FIELD

The present disclosure relates to a battery attaching/detaching structure.

BACKGROUND ART

For an electric vehicle (EV) in which a battery and an electric motor driven with the power supplied from the battery are mounted, a battery attaching/detaching structure for attaching/detaching the battery to the EV is known.

For example, PTL 1 discloses a battery attaching/detaching structure including a stand on which the battery is placed, a cover member that covers the battery placed on the stand, and a service plug.

In the above-mentioned battery attaching/detaching structure, the stand includes a shaft. In addition, the cover includes a notch and a stopper. In addition, the notch includes a first hole as a long hole elongated in the vehicle front-rear direction, and a second hole extending from a lower edge of the cover to a vehicle front end portion of the first hole. The shaft is inserted to the first hole such that it moves in the vehicle front-rear direction and does not move to the vehicle upward direction. When the shaft moves from the position of the vehicle rear end portion of the first hole to the position of the vehicle front end portion, the shaft can be detached from the notch through the second hole. In this manner, the cover can be detached from the stand, and the battery can be detached from the stand. The shaft is inserted to the first hole such that it cannot move to the vehicle upward direction, and thus the cover is fixed to the stand. The service plug is inserted at a position making contact with the stopper. When the service plug makes contact with the stopper, the shaft is held at the position of the vehicle rear end portion of the first hole. In this manner, the cover is prevented from being detached from the stand.

CITATION LIST

Patent Literature

PTL 1
Japanese Patent Application Laid-Open No. 2014-154398

SUMMARY OF INVENTION

Technical Problem

Incidentally, in the battery attaching/detaching structure disclosed in PTL 1, to detach the battery from the stand, the user pulls out the service plug such that the shaft can move from the position of the vehicle rear end portion of the first hole to the position of the vehicle front end portion. In addition, when fixing the cover to the stand to mount the battery to the stand, the service plug is inserted and the shaft is restrained at the position of the vehicle rear end portion of the first hole. That is, when attaching/detaching the battery, the user has to insert the service plug each time to fix or detach the battery to or from the stand, which is burdensome for the operator.

An object of the present disclosure is to provide a battery attaching/detaching structure that can improve the battery attaching/detaching operation.

Solution to Problem

To achieve the above-mentioned object, a battery attaching/detaching structure of the present disclosure includes: a guide part fixed to a vehicle and extended from a vehicle inside position to a vehicle outside position in an approximately horizontal direction; a mounting stand on which a battery for running the vehicle is placed, the mounting stand being configured to be guided by the guide part to move between the vehicle inside position and the vehicle outside position; a restraining part configured to restrain the battery at the mounting stand; and an operation cable configured to operate the restraining part to restrain the battery when the mounting stand is operated to move from the vehicle outside position to the vehicle inside position, and operate the restraining part to release restraint of the battery when the mounting stand is operated to move from the vehicle inside position to the vehicle outside position.

Advantageous Effects of Invention

According to present disclosure, the battery attaching/detaching operation can be improved.

DESCRIPTION OF EMBODIMENTS

Figure 1:
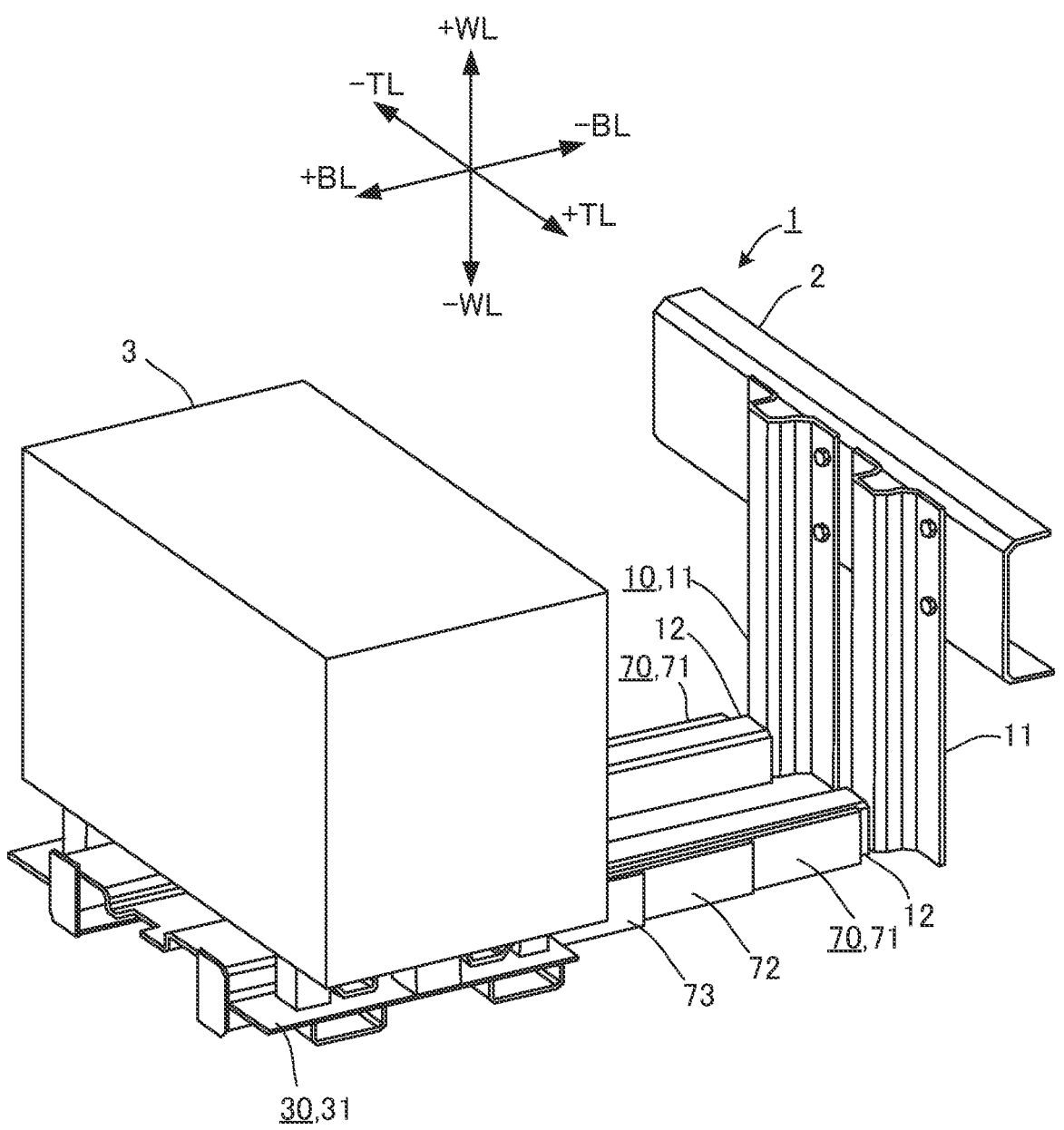
FIG. 1 is a perspective view illustrating an exemplary battery attaching/detaching structure of an embodiment of the present disclosure.
Figure 2:
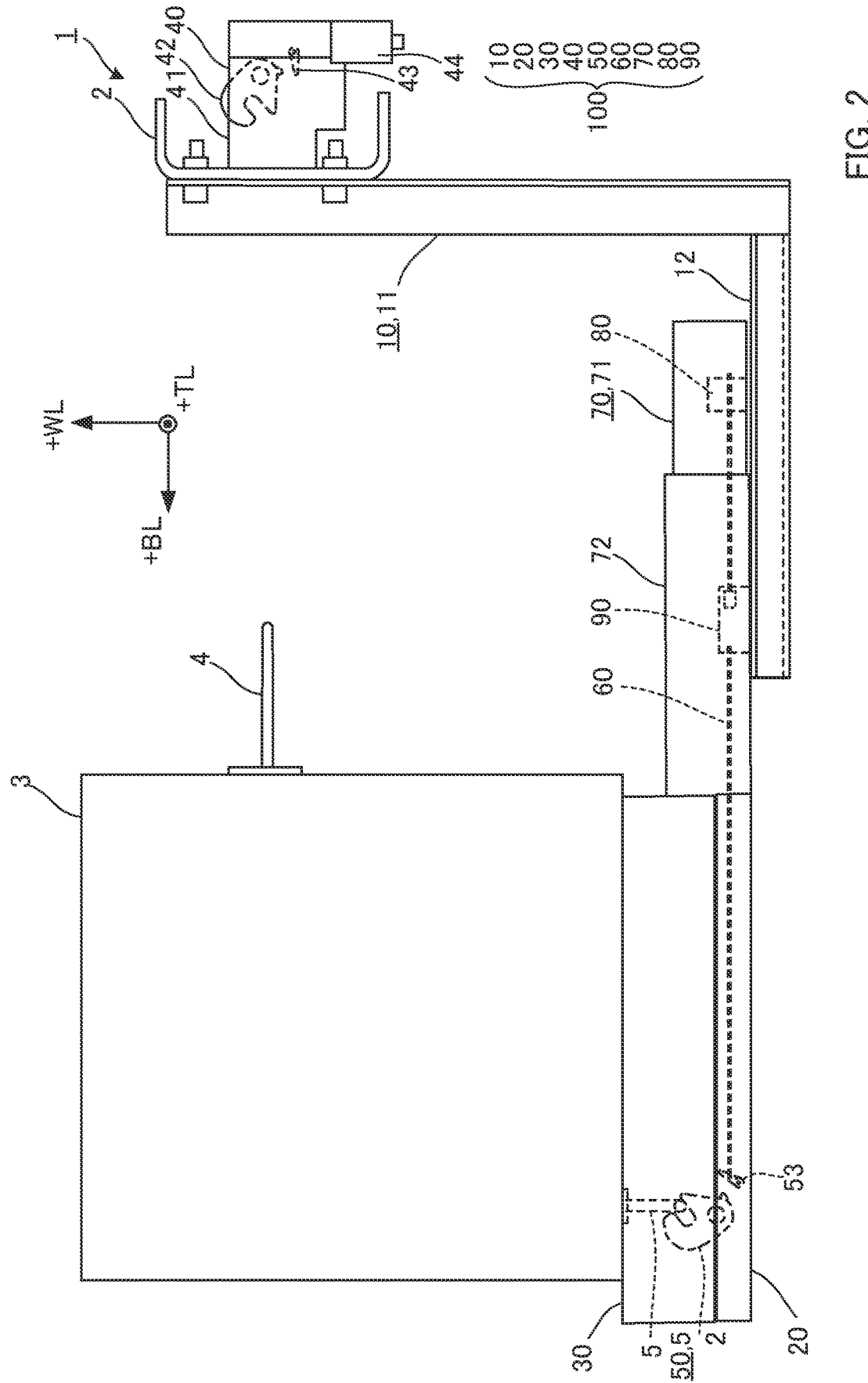
FIG. 2 is a side view illustrating an exemplary battery attaching/detaching structure of the embodiment of the present disclosure.

An embodiment of the present disclosure is described below with reference to the drawings. A battery attaching/detaching structure of the embodiment of the present disclosure is described below with reference to FIG. 1. FIG. 1 is a perspective view illustrating an exemplary battery attaching/detaching structure of an embodiment of the present disclosure. FIG. 2 is a side view illustrating an exemplary battery attaching/detaching structure of the embodiment of the present disclosure. FIG. 1 illustrates the BL axis, the TL axis and the WL axis. In FIG. 1, the vehicle width direction is referred to as "BL direction", the direction from the upper right to the lower left is referred to as vehicle width outside, vehicle width outward direction or "+BL direction", and the direction from the lower left to the upper right is referred to as vehicle width inside, vehicle width inward direction or "−BL direction". In addition, the vehicle front-rear direction is referred to as "TL direction", the direction from the upper left to the lower right is referred to as vehicle rear side, vehicle rearward direction or "+TL direction", and the direction from the lower right to the upper left is referred to as vehicle front side, vehicle frontward direction or "−TL direction". In addition, the vehicle up-down direction is referred to as "WL direction", the upward direction is referred to as vehicle upper side, vehicle upward direction or "+WL", and the lower direction is referred to as vehicle lower side, vehicle lower direction or "−WL".

Vehicle 1

The battery attaching/detaching structure according to the embodiment of the present disclosure is applied to an electric vehicle (EV) in which a battery that supplies power to the drive motor is mounted. In addition, examples of the EV to which the battery attaching/detaching structure according to the embodiment of the present disclosure is applied include commercial vehicles such as buses and trucks, but this is not limitative, and the examples may also include vehicles such as building vehicles, construction vehicles, and working vehicles. As illustrated in FIG. 2, the vehicle frame includes a pair of side members 2 separated from each other in the vehicle front-rear direction (TL direction).

Battery 3

FIGS. 1 and 2 schematically illustrate an external shape of battery 3. Battery 3 is a secondary battery with a substantially cuboid external shape. Battery 3 includes first striker 4 and second striker 5. First striker 4 is extended from the wall surface of battery 3 on the vehicle width inside (the −BL direction) to the vehicle width inside. Second striker 5 is extended from the wall surface (bottom surface) of battery 3 on the vehicle lower side (the −WL direction) to the vehicle lower side.

Attaching/detaching structure 100 includes guide part 10, guided part 20, mounting stand 30, main latch mechanism 40, sub-latch mechanism 50 (corresponding to "restraining part" of the present disclosure), operation cable 60, guide rail 70, turning part 80, and adjustment mechanism 90.

Guide Part 10

Guide part 10 includes a pair of fixing parts 11 fixed to side member 2, and a pair of extension parts 12 extending in the vehicle width outside (the +BL direction) from respective end portions of the pair of fixing parts 11 on the vehicle lower side (the −WL direction). Base 13 (see FIG. 7) is provided over the pair of extension parts 12.

Figure 3:
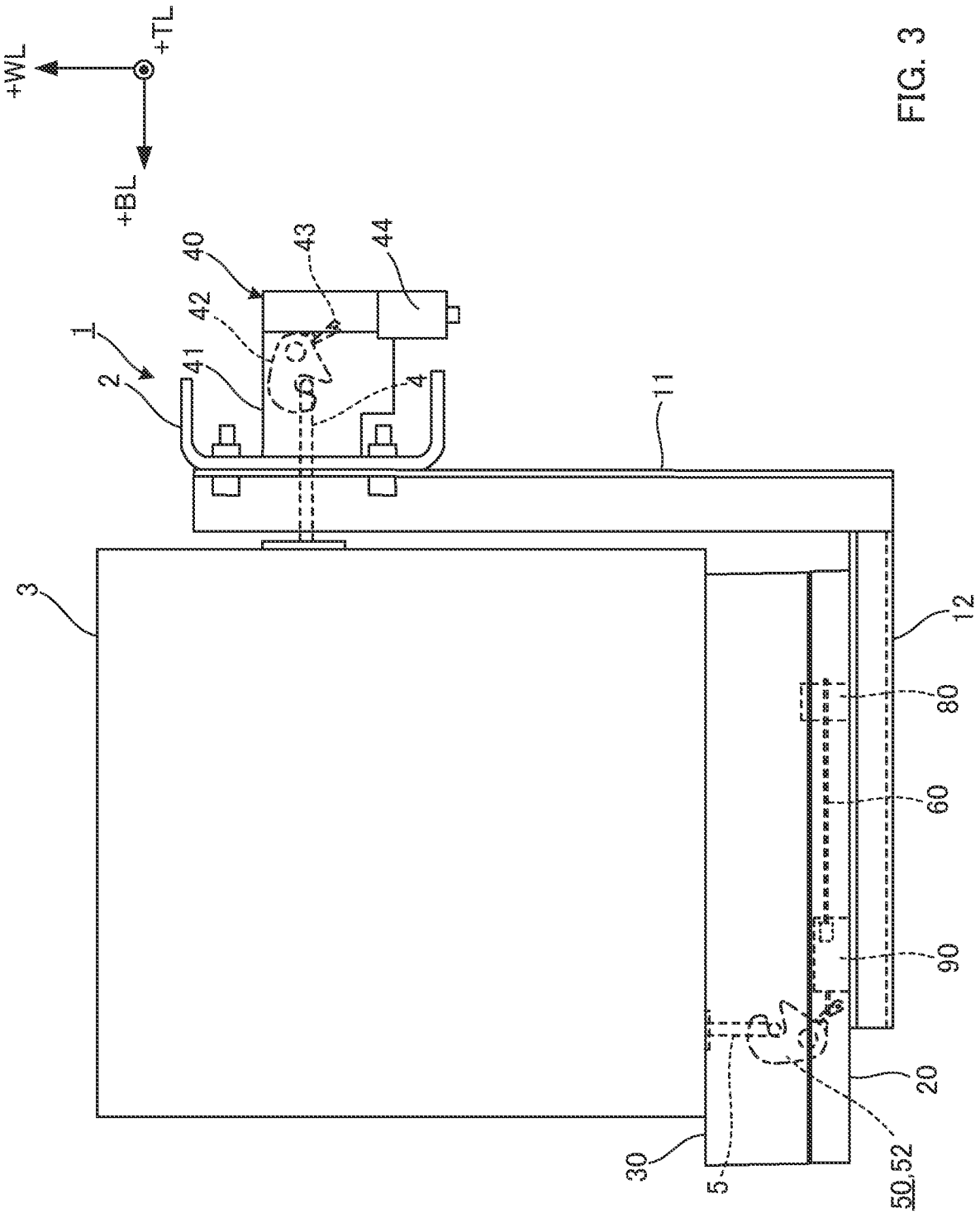
FIG. 3 is a side view illustrating an exemplary attaching/detaching structure of the battery with a mounting stand moved to a vehicle width inside position.
Figure 4:
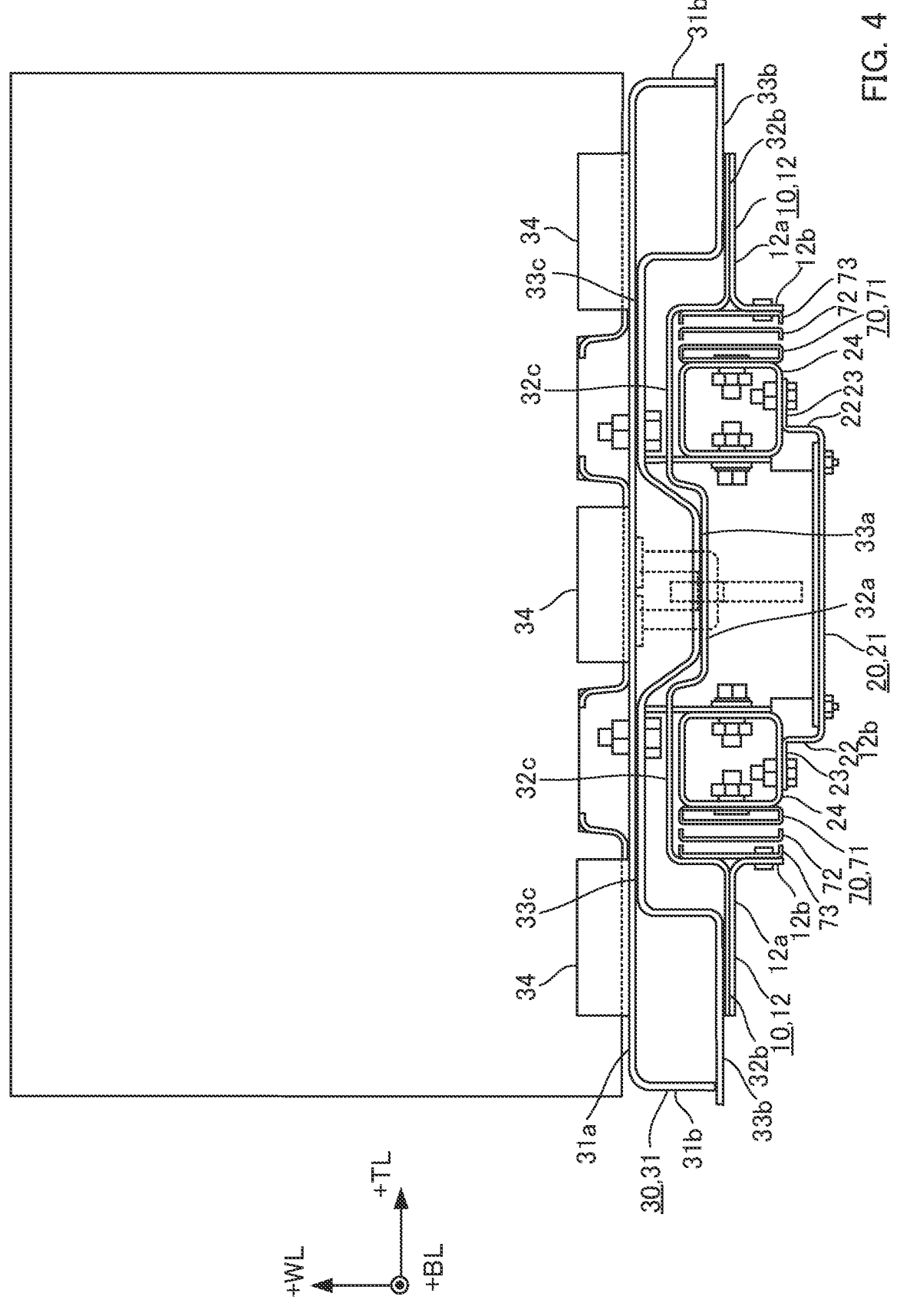
FIG. 4 is a front view illustrating an exemplary battery attaching/detaching structure of the embodiment of the present disclosure.

FIG. 3 is a side view illustrating an exemplary attaching/detaching structure of the battery with mounting stand 30 moved to a vehicle width inside position. In addition, FIG. 4 is a front view illustrating an exemplary battery attaching/detaching structure of the embodiment of the present disclosure.

The paired extension parts 12 are each an L-angle member, and are separated from each other in the vehicle front-rear direction (TL direction). Extension part 12 disposed on the vehicle front side (the −TL direction) includes flat plate part 12a extended from its corner portion to the vehicle front side (the −TL direction), and upright wall part 12b extended from the corner portion to the vehicle lower side (the −WL direction). Extension part 12 disposed on the vehicle rear side (the +TL direction) includes flat plate part 12a extended from its corner portion to the vehicle rear side, and upright wall part 12b extended from the corner portion to the vehicle lower side.

Guided Part 20

Guided part 20 includes rectangular bottom portion 21 with the vehicle width direction (the BL direction) as the longitudinal direction and the vehicle front-rear direction (TL direction) as the short direction, wall parts 22 raised to the vehicle upper side (the +WL direction) from both ends of bottom portion 21 in the short direction, and flange parts 23 extended from the ends of wall parts 22 on the vehicle upper side to the vehicle front side (the −TL direction) and the vehicle rear side (the +TL direction). Flange parts 23 each include a hollow part with a rectangular cross-sectional shape, and cylindrical parts 24 extended in the vehicle width direction are fixed to flange parts 23.

Guide Rail 70

Guide rails 70 are disposed in a symmetric manner on the vehicle rear side (the +TL direction) and the vehicle front side (the −TL direction) of extension part 12. Guide rails 70 disposed in a symmetric manner have the same configuration. In the following, guide rail 70 disposed on the vehicle front side (the −TL direction) is described as a representative. Guide rail 70 has a structure of three rails 71, 72 and 73 combined in three stages. Each of three rails 71, 72 and 73 is extended to the vehicle width outside (the +BL direction).

Rail 71 located on the vehicle rear side (the +TL direction) among three rails 71, 72 and 73 is fixed to cylindrical part 24. Rail 73 located on the vehicle front side (the −TL direction) among three rails 71, 72 and 73 is fixed to upright wall part 12b. Rail 72 located at the center in the vehicle front-rear direction among three rails 71, 72 and 73 is supported so as to be movable with respect to rail 71 and rail 73 in the BL direction through a bearing (not illustrated in the drawing). In this manner, each of three rails 71, 72 and 73 is configured to be movable in the vehicle width direction (the BL direction).

Guided part 20 is supported by extension part 12 through guide rail 70 so as to be movable in the BL direction. Each of extension part 12, guided part 20 and guide rail 70 is disposed on the vehicle lower side (the −WL direction) than mounting stand 30. In other words, mounting stand 30 is disposed on the vehicle upper side (the +WL direction) than extension part 12, guided part 20 and guide rail 70.

Mounting Stand 30

Battery 3 placed at mounting stand 30 is movable through guide rail 70 with respect to extension part 12 between the vehicle width inside position and the vehicle width outside position. Note that the vehicle width inside position corresponds to "vehicle inside position" of the present disclosure. In addition, the vehicle width outside position corresponds to "vehicle outside position" of the present disclosure.

Mounting stand 30 includes front plate 31, rear plate 32, middle plate 33, and a plurality of brackets 34.

Front plate 31 includes flat surface 31a with a substantially rectangular external shape, and flanges 31b extended to the vehicle lower side from the ends of flat surface 31a on the vehicle front side and the vehicle rear side.

Rear plate 32 is disposed on the vehicle lower side (the −WL direction) of front plate 31. Rear plate 32 includes center lower protrusion 32*a* protruded to the vehicle lower side and disposed at a center portion of rear plate 32 in the vehicle front-rear direction (TL direction), end lower protrusion 32*b* protruded to the vehicle lower side and disposed at positions on the vehicle front side (the –TL direction) and the vehicle rear side (the +TL direction) of rear plate 32, and upper protrusion 32*c* protruded to the vehicle upper side (the +WL direction) and disposed between center lower protrusion 32*a* and end lower protrusion 32*b*. End lower protrusion 32*b* is extended along the plane of flat plate part 12*a*, and is in contact with flat plate part 12*a* from the vehicle upper side.

Middle plate 33 is disposed on the vehicle lower side (the –WL direction) of front plate 31 and on the vehicle upper side (the +WL direction) of rear plate 32. In other words, middle plate 33 is sandwiched between front plate 31 and rear plate 32 in the vehicle up-down direction (the WL direction). Middle plate 33 includes center lower protrusion 33*a* protruded to the vehicle lower side and disposed at a center portion of middle plate 33 in the vehicle front-rear direction (TL direction), end lower protrusion 33*b* protruded to the vehicle lower side and disposed at positions on the vehicle front side (the –TL direction) and the vehicle rear side (the +TL direction) of middle plate 33, and upper protrusion 33*c* protruded to the vehicle upper side (the +WL direction) and disposed between center lower protrusion 33*a* and end lower protrusion 33*b*.

Center lower protrusion 33*a* is in contact with center lower protrusion 32*a* from the vehicle upper side (the +WL direction). End lower protrusion 33*b* is extended along the plane of end lower protrusion 32*b*, in contact with end lower protrusion 32*b* from the vehicle upper side, and in contact with the vehicle lower end portion of flange 31*b* from the vehicle lower side. Upper protrusion 33*c* is in contact with front plate 31 from the vehicle lower side.

Each of the plurality of brackets 34 is fixed to the vehicle upper side surface of front plate 31. Each of the plurality of brackets 34 is fit from the vehicle lower side (the –WL direction) into each of a plurality of recesses provided in the bottom portion of battery 3 and recessed to the vehicle upper side (the +WL direction). When battery 3 is placed on mounting stand 30, it is positioned in the vehicle width direction (the BL direction) and the vehicle front-rear direction (TL direction) with bracket 34 fitted in the recess.

Main Latch Mechanism 40

For main latch mechanism 40, a publicly known technique of engaging battery 3 with first striker 4 so as to restrain engaging battery 3 at the vehicle width inside position is used. For example, main latch mechanism 40 includes body 41, latch 42 disposed inside body 41 so as to be movable to the engaging position for engaging with first striker 4 and the detached position for being detached from first striker 4, a member (not illustrated in the drawing) for biasing latch 42 in the direction of moving from the engaging position to the detached position, pole 43 that is movable to the restraint position for restraining latch 42 at the engaging position and the restraint release position for releasing the restraint of latch 42, and drive motor 44 for driving pole 43 from the restraint position to the restraint release position.

Sub-Latch Mechanism 50

Figure 5:
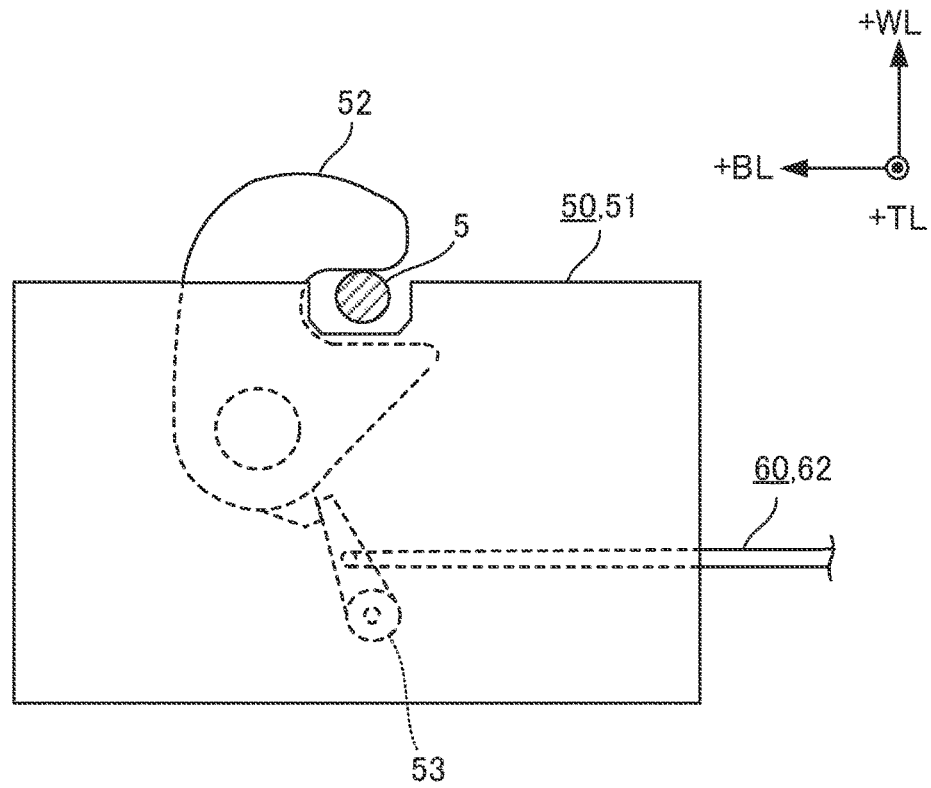
FIG. 5 is a side view illustrating an exemplary restraining part with the mounting stand moved to the vehicle width inside position.
Figure 6:
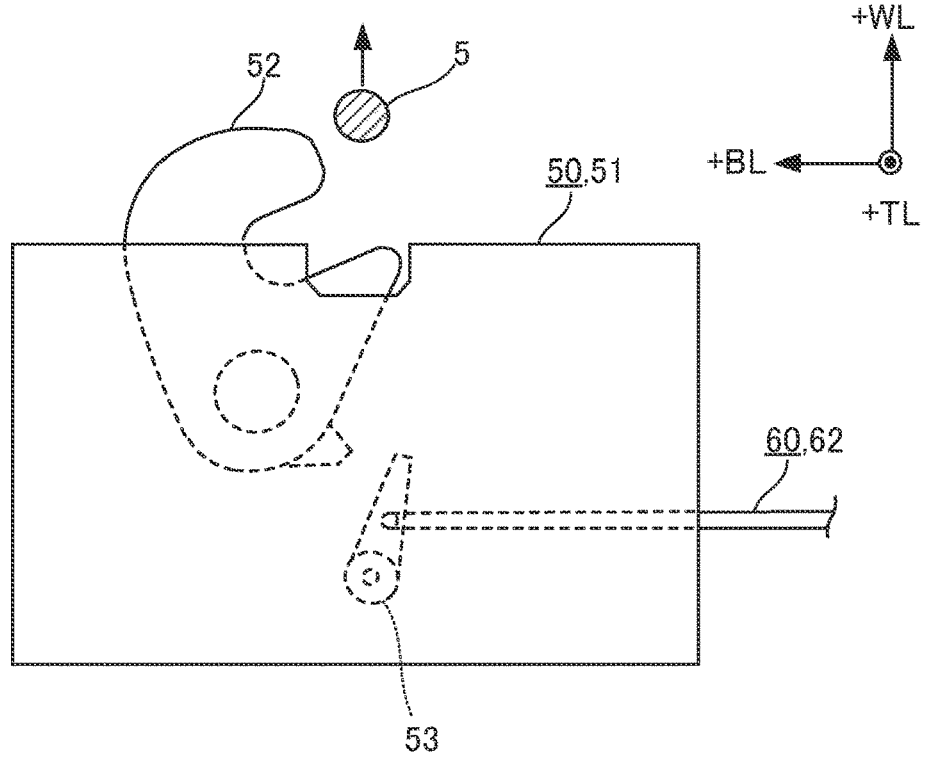
FIG. 6 is a side view illustrating an exemplary restraining part with the mounting stand moved to the vehicle width outside position.

FIG. 5 is a side view illustrating an exemplary restraining part with the mounting stand moved to the vehicle width inside position. FIG. 6 is a side view illustrating an exemplary restraining part with the mounting stand moved to the vehicle width outside position. Sub-latch mechanism 50 engages with second striker 5 so as to restrain battery 3 at the placement position (vehicle lower side position) where it is placed at mounting stand 30 (see FIGS. 3 and 5). Sub-latch mechanism 50 is detached from second striker 5 so as to release the restraint of battery 3 (see FIGS. 2 and 6).

Sub-latch mechanism 50 includes body 51, latch 52 disposed inside body 51 and configured to be movable to the engaging position for engaging with second striker 5 and the detached position for being detached from second striker 5, a member (not illustrated in the drawing) for biasing latch 52 in a direction of moving from the engaging position to the detached position, and pole 53 that is movable to the restraint position for restraining latch 52 at the engaging position and to the restraint release position for releasing the restraint of latch 52. Note that pole 53 is biased in the direction of the movement from the restraint release position to the restraint position.

Sub-latch mechanism 50 is disposed at a position on the vehicle width outside (the +BL direction) than the center position in mounting stand 30 in the vehicle width inner-and-outer direction (the BL direction).

Operation Cable 60

Figure 7:
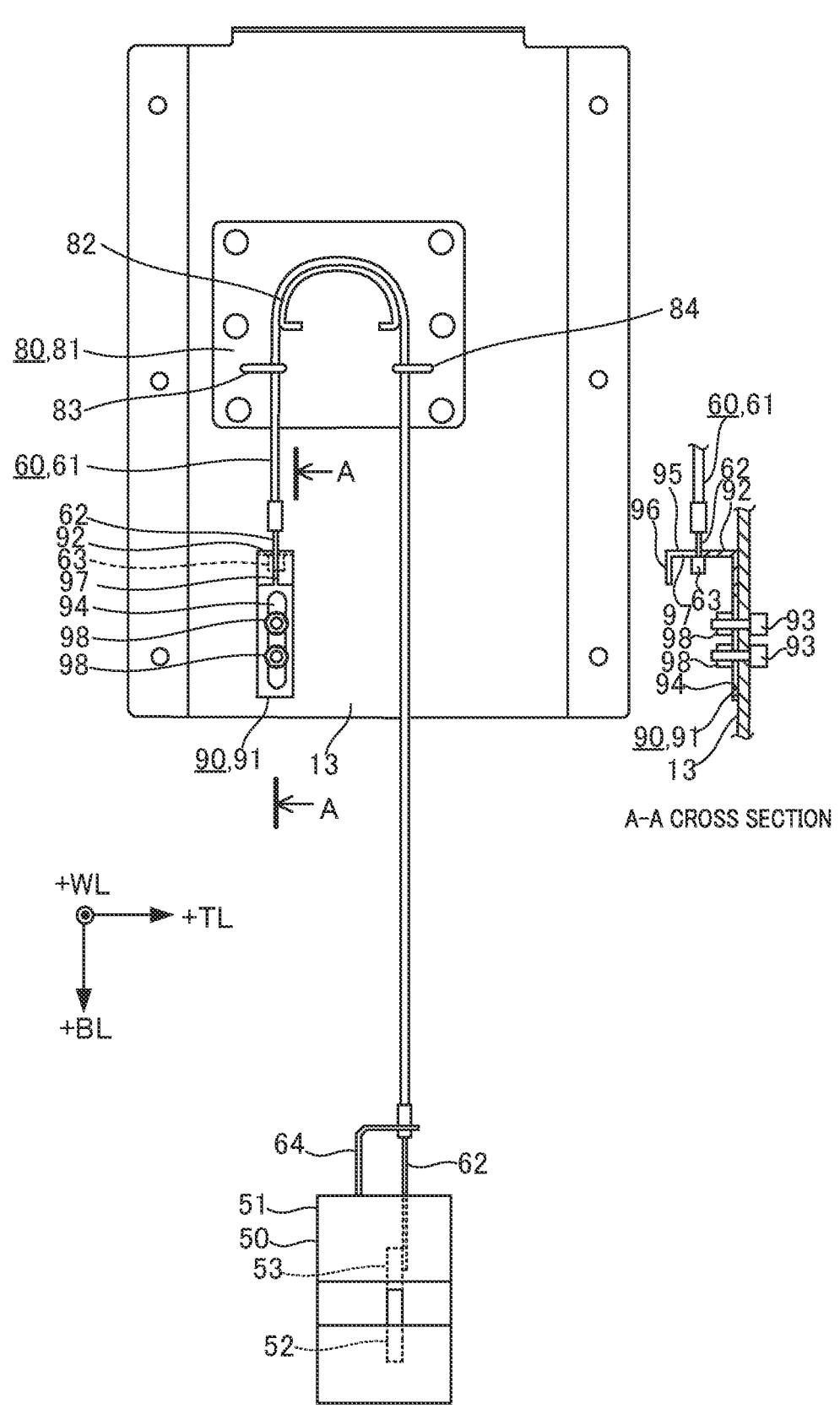
FIG. 7 is a plan view illustrating an exemplary operation cable with the mounting stand moved to the vehicle width outside position.
Figure 8:
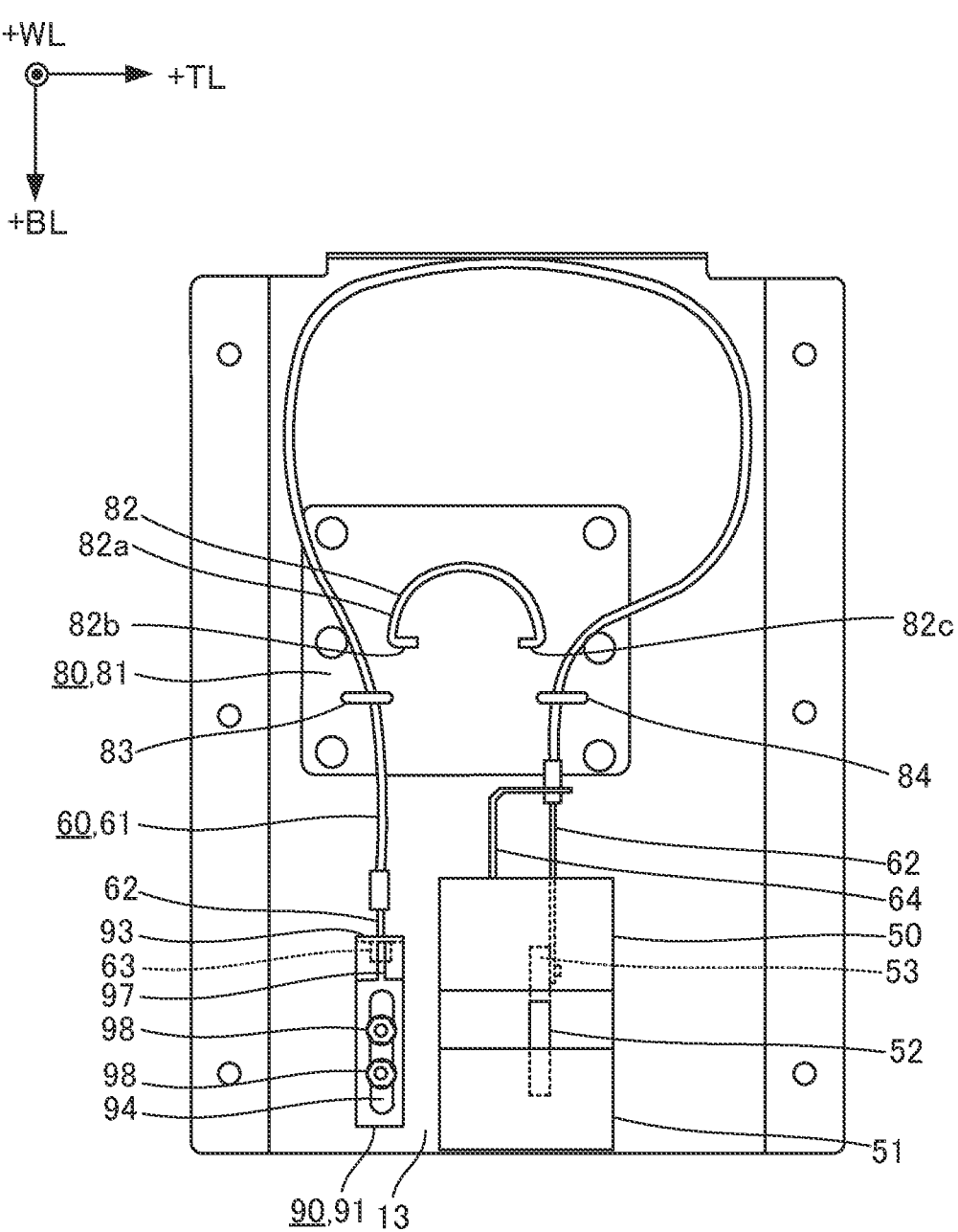
FIG. 8 is a plan view illustrating an exemplary operation cable with the mounting stand moved to the vehicle width inside position.
Figure 9:
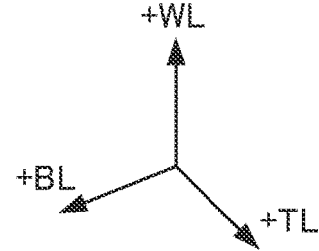
FIG. 9 is a perspective view illustrating an exemplary operation cable with the mounting stand moved to the vehicle width inside position.
Figure 9:
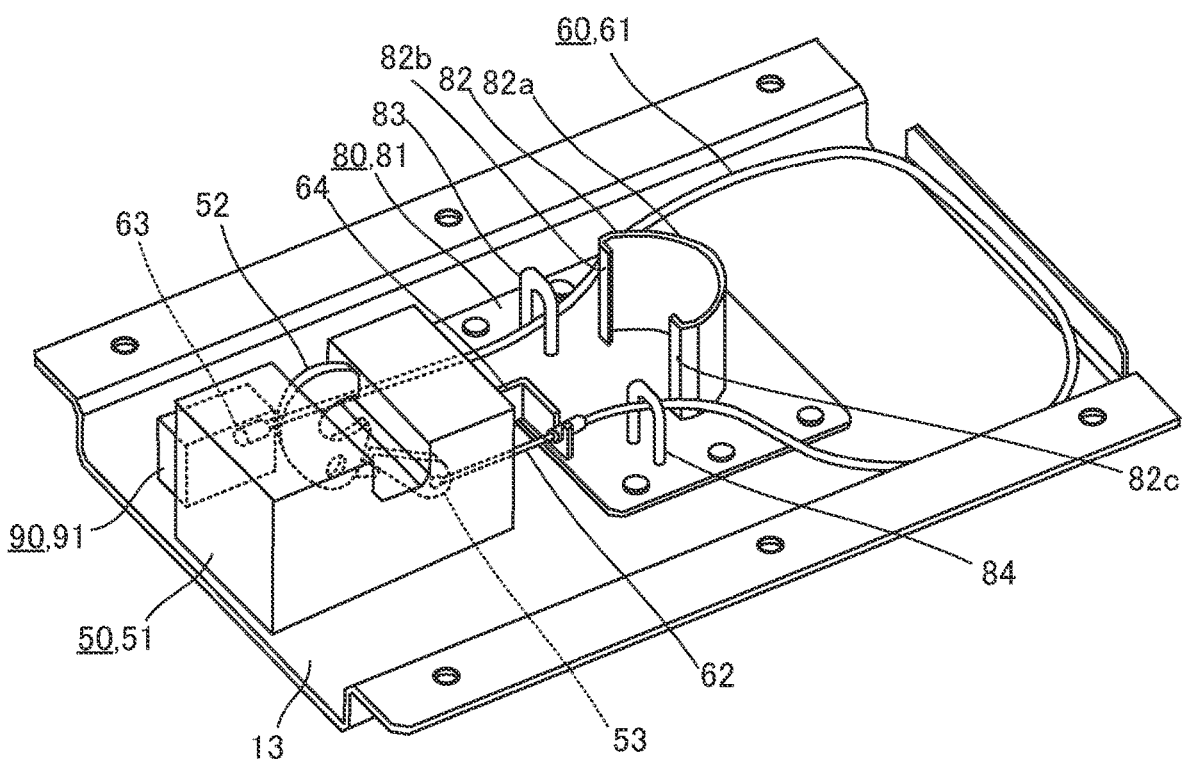

FIG. 7 is a plan view illustrating an exemplary operation cable with the mounting stand moved to the vehicle width outside position. FIG. 8 is a plan view illustrating an exemplary operation cable with the mounting stand moved to the vehicle width inside position. FIG. 9 is a perspective view illustrating an exemplary operation cable with the mounting stand moved to the vehicle width inside position.

When mounting stand 30 is operated to move from the vehicle width outside position to the vehicle width inside position, operation cable 60 operates pole 53 so as to restrain battery 3. When mounting stand 30 is operated to move from the vehicle width inside position to the vehicle width outside position, operation cable 60 operates pole 53 so as to release the restraint of battery 3.

Operation cable 60 includes outer casing 61 and inner wire 62. The center portion of operation cable 60 in the longitudinal direction is disposed so as to be wound around turning part 80. One end portion of inner wire 62 in the longitudinal direction includes locked part 63. Locked part 63 is locked to guide part 10 (base 13) through adjustment mechanism 90. The other end portion of outer casing 61 in the longitudinal direction is coupled with sub-latch mechanism 50 (body 51) through bracket 64. The other end portion of inner wire 62 in the longitudinal direction is coupled with sub-latch mechanism 50 (pole 53).

Turning Part 80

Turning part 80 includes plate 81, wall 82, gate 83, and gate 84.

Plate 81 is fixed to base 13. Plate 81 includes a flat plate with a rectangular external shape.

Wall 82 is raised in the vehicle upward direction (the +WL direction) from plate 81. Wall 82 includes half cylindrical wall part 82*a*, vehicle front side wall part 82*b*, and vehicle rear side wall part 82*c*.

Half cylindrical wall part 82*a* is an arc-shaped wall with a predetermined radius. Half cylindrical wall part 82*a* is protruded to the vehicle width inside (the –BL direction). The predetermined radius is set such that operation cable 60 can smoothly move with respect to half cylindrical wall part 82*a* when operation cable 60 is wound at half cylindrical wall part 82*a*. In addition, the predetermined radius is set corresponding to the positions of sub-latch mechanism 50 and adjustment mechanism 90 in the vehicle front-rear direction (TL direction).

Vehicle front side wall part 82*b* is bent from the vehicle front side end of half cylindrical wall part 82*a* to the vehicle rear side (the −TL direction).

Vehicle rear side wall part 82*c* is bent from the vehicle rear side end of half cylindrical wall part 82*a* to the vehicle front side (the +TL direction).

Gate 83 is disposed at a position corresponding to the end of half cylindrical wall part 82*a* on the vehicle front side. Gate 84 is disposed at a position corresponding to the end of half cylindrical wall part 82*a* on the vehicle rear side. Gate 83 and gate 84 have the same configuration. In the following, gate 83 is described as a representative. Gate 83 includes both leg parts uprightly provided at plate 81, and a bridge part that bridges the vehicle upper end portions of both leg parts. Both leg parts and the bridge part make up a through hole for passing operation cable 60 in the vehicle width direction (the BL direction). The bridge part includes a curved part curved to the vehicle upper side with a predetermined radius. The length between both leg parts and the radius of the curved part are set based on results of experiments and simulations in view of the ease of passing operation cable 60 and the like.

Relationship Between Operation Cable 60 and Turning Part 80

Next, a relationship between operation cable 60 and turning part 80 is described. When battery 3 is located at the vehicle width inside position illustrated in FIG. 8, the center portion of operation cable 60 in the longitudinal direction is in a deflected state, and is not wound at half cylindrical wall part 82*a*.

At a middle position located in the middle of movement of battery 3 from the vehicle width inside position to the vehicle width outside position, the center portion of operation cable 60 in the longitudinal direction is wound at half cylindrical wall part 82*a*. When operation cable 60 is wound at half cylindrical wall part 82*a*, the portion between one end portion of operation cable 60 in the longitudinal direction and the center portion of operation cable 60 in the longitudinal direction is tautened straight. In addition, the portion between the other end portion of operation cable 60 in the longitudinal direction and the center portion of operation cable 60 in the longitudinal direction is tautened straight. At this time, there is no relative movement between the other end portion of inner wire 62 and pole 53. In other words, pole 53 is not pulled by inner wire 62. Pole 53 is located at the restraint position for restraining latch 52 at the engaging position.

When battery 3 is moved from the middle position to the vehicle width outside position illustrated in FIG. 7, pole 53 is pulled by inner wire 62. In this manner, latch 52 is unrestrained from pole 53, and latch 52 is moved with the biasing force from the engaging position to the detached position where it is detached from the second striker 5.

Adjustment Mechanism 90

Next, adjustment mechanism 90 is described with reference to FIG. 7. Adjustment mechanism 90 includes slide part 91, lock part 92, and bolt 93 (see the sectional view taken along line A-A in FIG. 7).

Slide part 91 includes a flat belt-shaped plate including long hole 94 with the vehicle width direction (the BL direction) as the longitudinal direction.

Lock part 92 includes first bent portion 95 bent from the end of slide part 91 on the vehicle width inside (the −BL direction) to the vehicle upper side (the +WL direction), and second bent portion 96 bent from the end of the bent portion to the vehicle width outside (the +BL direction). Lock part 92 includes slit 97. Slit 97 includes a groove cut out from the center portion of first bent portion 95 in the vehicle up-down direction toward the vehicle upper end, and from the vehicle width inner end of second bent portion 96 (the vehicle upper end of first bent portion 95) to the edge on the vehicle width outside. Inner wire 62 is passed through slit 97, and locked part 63 is locked by lock part 92.

Bolt 93 includes a head and a screw. The head is fixed to base 13. The screw protrudes to the vehicle upper side (the +WL direction) from the vehicle lower side (the −WL direction) through long hole 94. Nut 98 is threadedly engaged with the vehicle upper end portion of the screw.

Slide part 91 is fixed at a predetermined position in the vehicle width direction (the BL direction) with nut 98 threadedly engaged with the vehicle upper end portion of the screw. The position of slide part 91 in the vehicle width direction can be adjusted by loosening nut 98. By adjusting the position of slide part 91 in the vehicle width direction, the length of operation cable 60 can be adjusted. The individual difference can be eliminated in the case where there is a variation in the attached position of sub-latch mechanism 50 and the like, and the length of operation cable 60.

Next, an example of an operation of battery attaching/detaching structure 100 is described.

Vehicle Width Inside Position

FIG. 3 illustrates battery 3 and mounting stand 30 moved to the vehicle width inside position. In addition, FIG. 8 illustrates sub-latch mechanism 50 moved to the vehicle width inside position. Latch 42 illustrated in FIG. 3 is engaged with first striker 4. In this manner, battery 3 is restrained at the vehicle width inside position. In addition, latch 52 illustrated in FIG. 3 is engaged with second striker 5. In this manner, battery 3 is restrained at mounting stand 30 (sub-latch mechanism 50). In addition, as illustrated in FIG. 8, operation cable 60 is deflected (in the vehicle horizontal direction) on base 13.

Moving Operation from Vehicle Width Inside Position to Vehicle Width Outside Position When battery 3 is operated to move from the vehicle width inside position to the vehicle width outside position, drive motor 44 is driven by the user operation such that pole 43 moves from the restraint position to the restraint release position. In this manner, with the biasing force, latch 42 is moved from the engaging position to the detached position and detached from first striker 4, and thus battery 3 can be moved by the user operation from the vehicle width inside position to the vehicle width outside position.

Battery 3 (mounting stand 30) is moved by the user operation from the vehicle width inside position to the vehicle width outside position. As battery 3 is moved from the vehicle width inside position to the vehicle width outside position, the center portion of operation cable 60 in the longitudinal direction is wound at half cylindrical wall part 82*a*. As a result, the state of operation cable 60 on base 13 (in the vehicle horizontal direction) is changed from the deflected state to the taut state. Then, when battery 3 is further moved to the vehicle width outside, the pulling force of inner wire 62 pulling pole 53 is generated, and pole 53 moves from the restraint position to the restraint release position, and thus, pole 53 releases the restraint of latch 52. In this manner, latch 52 is moved with the biasing force from the engaging position to the detached position.

Vehicle Width Outside Position

FIG. 2 illustrates battery 3 and mounting stand 30 moved to the vehicle width outside position. In addition, FIG. 7 illustrates sub-latch mechanism 50 moved to the vehicle width outside position. Latch 52 illustrated in FIG. 2 is moved with the biasing force from the engaging position to the detached position. In this manner, battery 3 is unrestrained from sub-latch mechanism 50.

Attaching/Detaching Operation of Battery 3

When battery 3 (mounting stand 30) is moved to the vehicle width outside position, battery 3 is unrestrained from sub-latch mechanism 50, and thus battery 3 can be detached by the user operation from mounting stand 30. In addition, battery 3 can be placed on mounting stand 30. When battery 3 is placed on mounting stand 30, second striker 5 pushes latch 52. In this manner, latch 52 moves from the detached position to the engaging position against the biasing force, and latch 52 engages with second striker 5.

Moving Operation from Vehicle Width Outside Position to Vehicle Width Inside Position Mounting stand 30 on which battery 3 is placed is moved by the user operation from the vehicle width outside position to the vehicle width inside position. When the pulling force of inner wire 62 pulling pole 53 decreases as battery 3 moves from the vehicle width outside position to the vehicle width inside position, and the biasing force of biasing pole 53 becomes greater than the pulling force, pole 53 moves from the restraint release position to the restraint position, and pole 53 restrains latch 52 at the engaging position.

In addition, when battery 3 (mounting stand 30) moves from the vehicle width outside position to the vehicle width inside position, the center portion of operation cable 60 in the longitudinal direction is reset from the state of being wound at half cylindrical wall part 82a. As a result, operation cable 60 is deflected (in the vehicle horizontal direction) on base 13.

In addition, when battery 3 (mounting stand 30) moves to the vehicle width middle position, first striker 4 pushes latch 42. In this manner, latch 42 moves from the detached position to the engaging position, and latch 42 engages with first striker 4. Then, pole 43 moves from the restraint release position to the restraint position, and restrains latch 42 at the engaging position. In this manner, battery 3 is restrained at the vehicle width inside position.

In the above-described manner, by operating mounting stand 30 on which battery 3 is placed to move from the vehicle width inside position to the vehicle width outside position, battery 3 can be detached from mounting stand 30 without performing special operations. In addition, with battery 3 placed on mounting stand 30, by operating mounting stand 30 on which battery 3 is placed to move from the vehicle width outside position to the vehicle width inside, battery 3 is prevented from being detached from mounting stand 30 without performing special operations. In this manner, the battery attaching/detaching operation can be improved.

Battery attaching/detaching structure 100 of the present embodiment includes: guide part 10 fixed to vehicle 1 and extended from the vehicle inside position to the vehicle outside position in an approximately horizontal direction; mounting stand 30 on which vehicle travelling battery 3 is placed, mounting stand 30 being configured to be guided by guide part 10 to move between the vehicle inside position and the vehicle outside position; sub-latch mechanism 50 configured to restrain battery 3 at mounting stand 30; and operation cable 60 configured to operate sub-latch mechanism 50 to restrain battery 3 when mounting stand 30 is operated to move from the vehicle outside position to the vehicle inside position, and operate sub-latch mechanism 50 to release restraint of battery 3 when mounting stand 30 is operated to move from the vehicle inside position to the vehicle outside position.

With the above-mentioned configuration, by operating mounting stand 30 on which battery 3 is placed to move from the vehicle width inside position to the vehicle width outside position, battery 3 can be detached from mounting stand 30 without performing special operations in such a manner that operation cable 60 operates sub-latch mechanism 50 and battery 3 is unrestrained. In addition, by placing battery 3 on mounting stand 30 and operating mounting stand 30 on which battery 3 is placed to move from the vehicle width outside position to the vehicle width inside, battery 3 is prevented from being detached from mounting stand 30 without performing special operations in such a manner that operation cable 60 operates sub-latch mechanism 50 and battery 3 is restrained. In this manner, the battery attaching/detaching operation can be improved.

In addition, battery attaching/detaching structure 100 of the present embodiment further includes an adjustment mechanism configured to adjust a length of operation cable 60. In this manner, in the case where there is variation in the length of operation cable 60, the individual difference can be eliminated. In addition, even in the case where there is variation in the attaching component for operation cable 60 such as bracket 64 and the attaching position, the variation can be eliminated.

In addition, in battery attaching/detaching structure 100 of the present embodiment, when mounting stand 30 is operated to move from the vehicle outside position to the vehicle inside position, operation cable 60 is deflected in a vehicle horizontal direction. In this manner, operation cable 60 is not deflected to the vehicle lower side, and thus it is possible to prevent operation cable 60 from interfering with objects fallen on the ground and the like, for example.

In battery attaching/detaching structure 100 of the present embodiment, sub-latch mechanism 50 is disposed at a position on a vehicle outside than a center position in a vehicle inner-and-outer direction in mounting stand 30. Since the position of sub-latch mechanism 50 is closer to the vehicle width outside than the center position, the total length of operation cable 60 can be longer than the length of operation cable 60 disposed at the center position, and thus the adjustment range in the longitudinal direction can be sufficiently provided. In this manner, the inhibition of the releasing operation of latch 52 due to the individual difference of operation cable 60 can be reduced, for example.

In addition, in battery attaching/detaching structure 100 of the present embodiment, sub-latch mechanism 50 is engaged with a striker fixed to the battery. In this manner, with a simple configuration in which second striker 5 is disposed in battery 3, battery 3 can be restrained at mounting stand 30 (sub-latch mechanism 50).

In addition, in battery attaching/detaching structure 100 of the present embodiment, guide part 10 includes turning part 80, one end portion of operation cable 60 in a longitudinal direction is coupled with guide part 10, another end portion of operation cable 60 in the longitudinal direction is coupled with sub-latch mechanism 50, and a center portion of operation cable 60 in the longitudinal direction is disposed so as to be wound at the turning part 80. Since the center portion of operation cable 60 in the longitudinal direction is wound at turning part 80, the total length of operation cable 60 can be increased in comparison with the case where operation cable 60 is simply extended in the vehicle width direction without being wound at turning part 80, and thus the adjustment range of operation cable 60 in the longitudinal direction can be sufficiently provided.

Note that in the present embodiment, the vehicle inner-and-outer direction as the movement direction of battery 3

(mounting stand 30) is the vehicle width inner-and-outer direction, but the present disclosure is not limited to this, and it may be the vehicle front-rear direction. In addition, the installation position of battery attaching/detaching structure 100 is side member 2, but it needs only to be a component making up the vehicle.

The above-mentioned embodiments are merely examples of embodiments for implementing the disclosure, and the technical scope of the disclosure should not be interpreted as limited by them. In other words, the present disclosure can be implemented in various forms without deviating from its gist or main features.

INDUSTRIAL APPLICABILITY

The present disclosure is favorably utilized for vehicles including a battery attaching/detaching structure that requires improvement of the battery attaching/detaching operation.

The invention claimed is:

1. A battery attaching/detaching structure comprising:
a guide part fixed to a vehicle and extended from a vehicle inside position to a vehicle outside position in an approximately horizontal direction;
a mounting stand on which a battery for running the vehicle is placed, the mounting stand being configured to be guided by the guide part to move between the vehicle inside position and the vehicle outside position;
a restraining part configured to restrain the battery at the mounting stand; and
an operation cable configured to operate the restraining part to restrain the battery when the mounting stand is operated to move from the vehicle outside position to the vehicle inside position, and operate the restraining part to release restraint of the battery when the mounting stand is operated to move from the vehicle inside position to the vehicle outside position.

2. The battery attaching/detaching structure according to claim 1, further comprising an adjustment mechanism configured to adjust a length of the operation cable.

3. The battery attaching/detaching structure according to claim 1, wherein when the mounting stand is operated to move from the vehicle outside position to the vehicle inside position, the operation cable is deflected in a vehicle horizontal direction.

4. The battery attaching/detaching structure according to claim 1, wherein the restraining part is disposed at a position on a vehicle outside than a center position in a vehicle inner-and-outer direction in the mounting stand.

5. The battery attaching/detaching structure according to claim 1, wherein the restraining part is engaged with a striker fixed to the battery.

6. The battery attaching/detaching structure according to claim 1,
wherein the guide part includes a turning part,
wherein one end portion of the operation cable in a longitudinal direction is coupled with the guide part,
wherein another end portion of the operation cable in the longitudinal direction is coupled with the restraining part, and
wherein a center portion of the operation cable in the longitudinal direction is disposed so as to be wound at the turning part.

* * * * *